United States Patent [19]

Hodges et al.

[11] 4,398,810
[45] Aug. 16, 1983

[54] FRESNEL LENS SYSTEM

[75] Inventors: Marvin P. Hodges, St. Petersburg, Fla.; Richard A. Buchroeder, Tucson, Ariz.

[73] Assignee: B Optical, St. Petersburg, Fla.

[21] Appl. No.: 350,001

[22] Filed: Feb. 18, 1982

[51] Int. Cl.³ .................. G02B 3/08; G02B 17/00
[52] U.S. Cl. ......................... 350/452; 350/445
[58] Field of Search ..................... 350/452, 445

[56] References Cited

U.S. PATENT DOCUMENTS 3,537,771 11/1970 Trufanoff ............. 350/452 X
3,767,291 10/1973 Johnson ............. 350/452 X
4,051,535  9/1977 Inglis ............. 350/452 X
4,309,074  1/1982 Graniari, Jr. ............. 350/452 X Primary Examiner—John K. Corbin
Assistant Examiner—Scott J. Sugarman
Attorney, Agent, or Firm—Mason, Kolehmainen, Rathburn & Wyss

[57] ABSTRACT

A projection lens system of the type used in connection with cathode ray tubes, and more specifically a cathode ray tube projection system having an internal lens folding means, useful in projecting an image or series of images on a screen.

11 Claims, 7 Drawing Figures

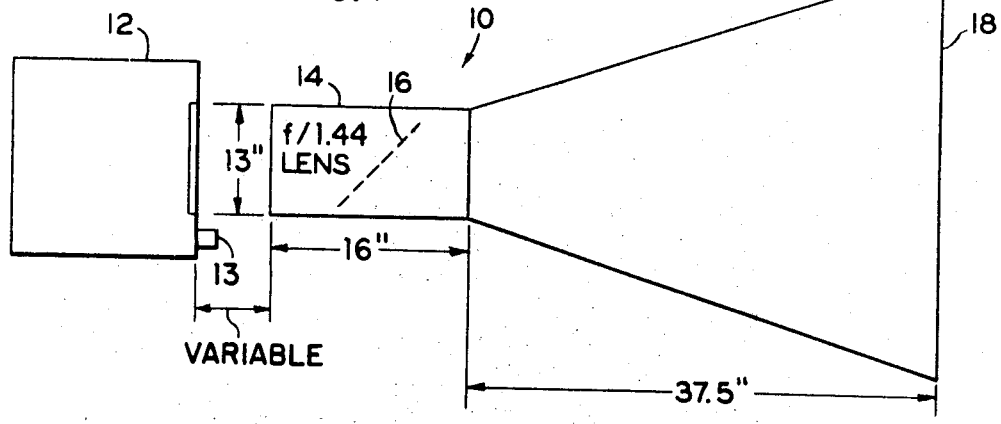
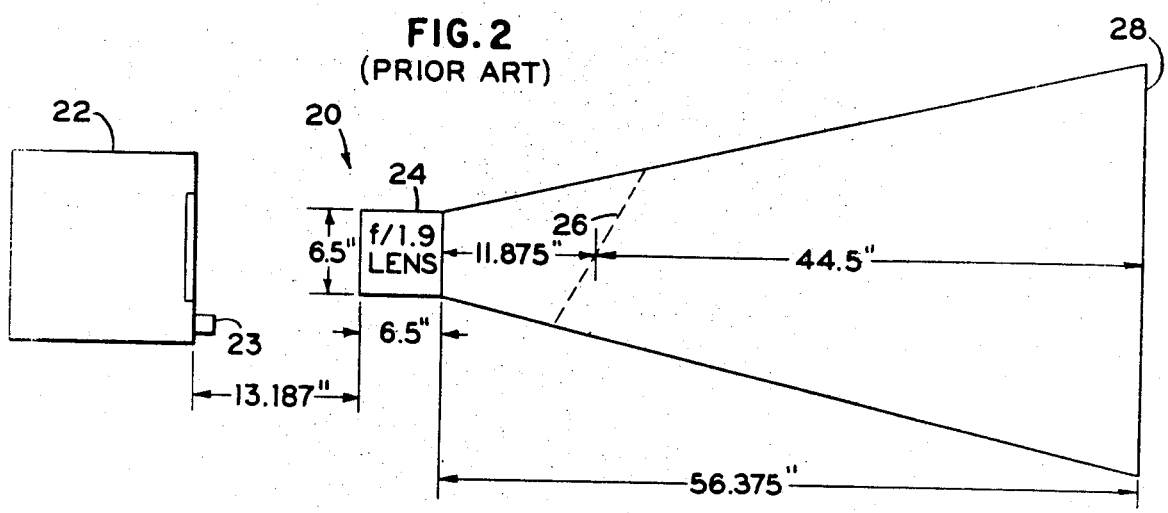
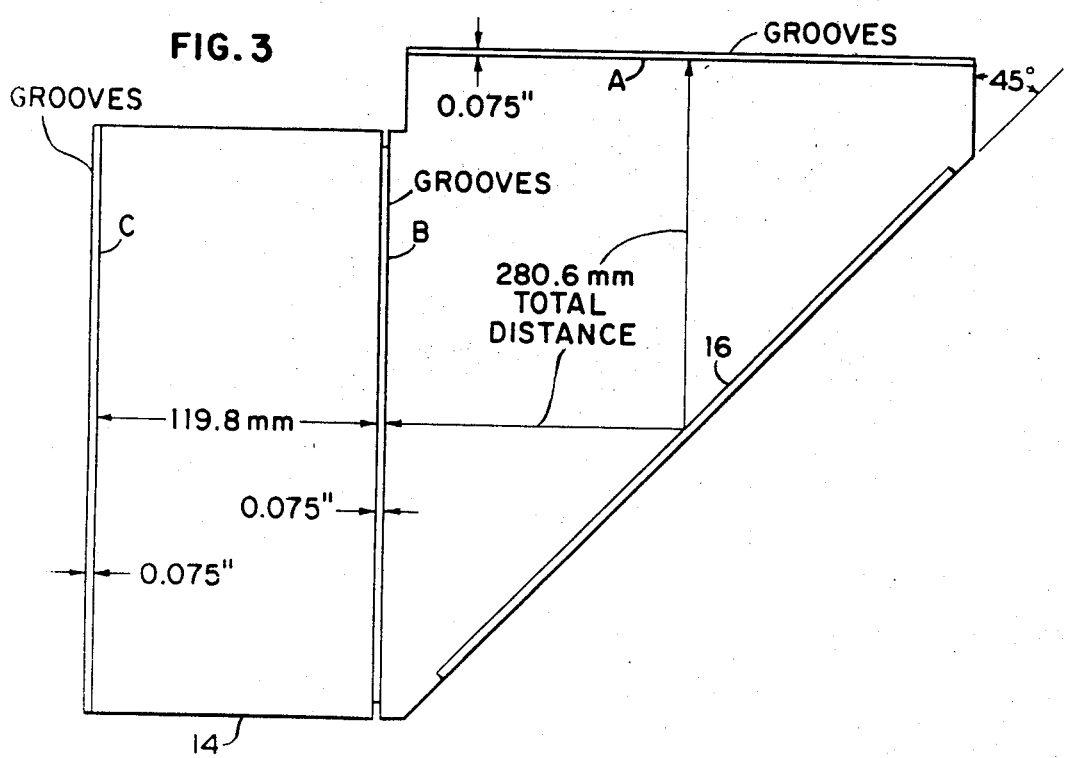

x = f(y)

θ = f'(y)

FRESNEL LENS SYSTEM

BACKGROUND OF THE INVENTION

1. Field of the Invention

This invention relates generally to projection lens systems of the type used in connection with cathode ray tubes and specifically relates to such a system having an internal lens folding means.

2. Description of the Prior Art

Heretofore, consumers desiring to enjoy the advantages of large screen projection color television had to choose between the lesser of two evils, figuratively speaking. They could purchase an expensive multiple cathode ray tube projector specifically designed for large screen projection, or they could purchase a lens system adaptable to the single cathode ray tube of their existing set. Selection of either option required making a trade-off. For example, the multiple tube system is limited to applications wherein the projection screen has a luminance gain of 10 or less because two or more colors are projected along different optical axes, and color shifting occurs due to the differential in reflectance angles. Projection from a single cathode ray tube does not suffer from this color shifting limitation, since all colors are projected along a common axis of the cathode ray tube.

The single color cathode ray tube can therefore be used in applications wherein the projection screen luminance gain is much greater than 10. The use of higher gain screens compensates, at least to a limited degree, for the luminous inefficiency of the cathode ray tube. Unfortunately, the limitations of the prior art lenses have prevented the use of single cathode ray tubes with projection screens having a gain higher than 13. Specifically, prior art lenses are restricted to about 13 gain screens to avoid a serious loss of viewing angles, which loss would render such lenses unacceptable to consumers. Prior art lenses are limited in speed to about f/1.9, to control their diameters to thereby permit a limited folding of the image beam, and by optical aberrations. This inability of prior art lens systems to be used with single cathode ray tubes in conjunction with projection screens having a gain of 13 or greater has the effect of wasting the capability of higher gain screens to provide brighter images.

The increased specularity (brightness) of high gain screens also enables them to reject ambient light, and ambient light rejection enhances the contrast ratio range of the projected image. Although CRT tube brightness is important, in the limit, the ability of the projection screen to reject ambient light is even more critical than the brightness of the tube. This follows because while tube brightness influences highlights, the black range is influenced by a screen's light rejection or room darkening control.

Prior art lenses have focal lengths of 300 mm or more, and generate incidence angles of up to 13 degrees which, when used with a 13 gain screen, provide acceptable viewing at 25 degrees half angles of 15 percent of the on-axis brightness (about 2 gains). It is desirable to achieve such a viewing angle with a 17 gain screen, so that the above-described characteristics of a high gain screen could be harnessed. However, to achieve such a viewing angle with a 17 gain screen would require a vertical lens incidence angle of 17 degrees (a focal length of 280 mm) and a lens speed of f/1.5. However, as we have seen, prior art lenses are restricted to incidence angles of less than 13 degrees, because prior art lens speeds are limited in speed to only f/1.9. Clearly, then, the prior art lenses are prevented from harnessing the desirable characteristics of 17 or higher gain screens as a result of the aforesaid limitations inherent in prior art systems. If these limitations could be overcome, a substantial increase in contrast could be achieved. Accordingly, the image on such a screen would be perceived as being substantially brighter.

A lens of a speed of f/1.44 (as measured on the image side), with a screen of a brightness of 17 gains and a standard 13 inch cathode ray tube will produce an image of superior contrast to most multi-tube projectors using screens of 8 gains. The observer will perceive this superior contrast as a brighter picture, though in fact it is less bright. Contrast will favor the single tube projectors down to 5 foot candles of ambient light; at that point, and darker, the picture of the multi-tube projector will dominate.

Still further limitations appear in prior systems. Image folding techniques associated with prior art lenses place the television behind the mirror and under the screen, making the controls and internal loudspeaker inoperative. The mirror required with prior art systems averages 14 inches × 17 inches, and is subject to dirt accumulations, mounting distortion, weight and cost penalties. Prior art systems also require that the television face toward the audience, glaring over the top of the mirror-holder into the eyes of the viewer.

Keystone distortion results from the absence of perpendicularity between the screen and image. When the top of the image beam travels farther to the screen, it is enlarged relative to rays traveling a shorter distance, resulting in egg-shaped heads, bowed titles, etc. Keystone distortion is most noticeable in off-axis projection using projectors of considerable luminosity, or projection onto screens of a brightness rating of 5 gains or greater; however, due to the law of reflection, a perpendicular condition would reflect the primary rays back to the projector, so perpendicularity must be avoided to redirect the reflected image back into the audience zone. While prior art lenses have an actual beam angle up to 16 degrees, due to the aspect ratio (the vertical height) of the image source and projection screen, their reflected beam angles are restricted to 13 degrees or less, producing a minimum of 56 percent keystone distortion (the screen should be oriented at 30 degrees from the vertical to be perpendicular, but can at best be 13 degrees, generating a 17 degree error, or 56 percent distortion). While 56 percent distortion is acceptable to many viewers, it is still distracting to others, particularly because such distortion occurs from the center of the image and upwards. However, it has been demonstrated that distortion under 40 percent is not obvious to most viewers. Also, the wider the vertical beam, the less critical is the screen's angle; accordingly, a 17 degree vertical beam angle appears parallel on a 20 degree screen, which results in only 33 percent distortion—well below industry standards (and 41 percent improved over 13 degree beam angles).

It is clear that there is a long standing and heretofore unfulfilled need for a large screen projection lens system that permits superior projection from standard television sets, while allowing the controls and internal speakers of such sets to remain operative. The improved system will have improved brightness and projection angles over prior art systems. The improved system will also require less space than the prior art systems, and will be less expensive.

SUMMARY OF THE INVENTION

The limitations of the prior art are overcome in a system that includes a lens system of a focal length of 280 mm, when normalized to a 13 inch diagonal measure cathode ray tube, having three elements and an image folding means interposed between two of said three elements. The system incorporates a reflection angle of 21 degrees for the horizontal and 17 degrees for the vertical. The image folding means serves as the f-stop of the lens, further reducing the size of the image folding means and reducing the element spacing.

It is an object of the invention to provide a projection lens system for use with a single cathode ray tube and projection screens of 13 gains or higher.

It is a closely related object of the invention to provide such a system at a desirable viewing angle while minimizing keystone distortion.

Another object is to provide such a system that requires less space than the systems of the prior art.

Still another object is to provide such a system of high quality at a lower price than the prior art systems, due to the savings in materials made possible by the inventive system.

Yet another object is to provide a projection system that maintains the operability of the controls and speakers of a standard television receiver.

The invention accordingly comprises the features of construction, combination of elements, and arrangements of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is an elevational diagrammatic view of the inventive system in its unfolded configuration;

FIG. 2 is an elevational diagrammatic view of a typical system of the prior art in its unfolded configuration;

FIG. 3 depicts the folded and unfolded configurations of the inventive lens system in elevational view, the former being shown in solid lines, and the latter being shown in phantom lines;

DETAILED DESCRIPTION OF THE PREFERRED EMBODIMENT

Figure 6:
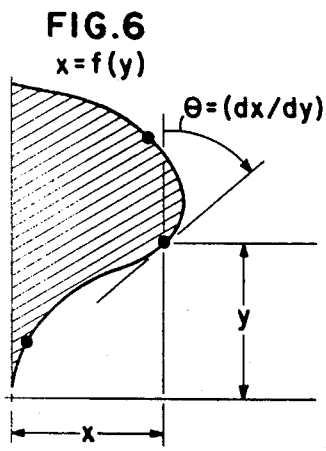
FIG. 6 is a graph of a typical generating function used to define a Fresnel lens.

The inventive system is shown in unfolded configuration in FIG. 1 and is generally designated 10.

The typical prior art system is shown in FIG. 2 for comparison purposes, and is designated 20 as a whole.

A preferred embodiment of the inventive system 10 includes a television set 12 having a set of controls 13 and a 13 inch (measured diagonally) shadow mask tube (or other directly viewable display), a system of preferably three Fresnel lenses (elements A, B and C, FIG. 3) indicated diagrammatically as 14 (the preferred spacing and disposition of the individual lenses and the image forming means being best seen in FIG. 3), an image folding means (a mirror) 16 disposed intermediate to two of the Fresnel lenses and a 32 inch by 40 inch projection screen 18 (FIG. 4) tilted, in the illustrated embodiment, 17 to 20 degrees from the vertical. In a commercial embodiment, depicted in FIG. 1, the lens system 14 has a longitudinal dimension of nominally 16 inches in its unfolded configuration, a height dimension of approximately 13 inches, and its proximal end is spaced on the order of 5.7 inches from the image source 12. The screen 18 is spaced only about 37.5 inches from the distal end of the lens system 14. These dimensions will vary somewhat, as necessary to achieve focus, depending on the relative spacings between the lens 14, the source 12 and the screen 18.

The substantial spatial savings provided by the invention is readily apparent when the corresponding dimensions of the prior art systems are examined. Specifically, in FIG. 2, a television set 22 having a set of controls 23 and a 13 inch cathode ray tube 22 is spaced 13.187 inches from the proximal end of the lens system, diagrammatically shown and indicated as 24. Prior art lens systems are generally 6.5 inches by 6.5 inches, and the mirror 26 is generally spaced from the distal end of the lens system 24 at a distance of 11.875 inches. Thus, the distal end of the lens system 24 is spaced 56.375 inches from the 32 inch by 40 inch screen 28. Assuming a typical set 22 thickness of at least 15 inches, it is seen that a typical installation of the prior art consumes 90 inches of linear space, if used in its unfolded configuration.

It will be observed in FIG. 2 that the lens folding mirror 26 of the prior art is 14 inches by 17 inches, whereas the mirror for the inventive system is on the order of only 12 inches by 12 inches. The reduced size and cost of the mirror 16 employed in the inventive system, together with the reduced distortion achieved with a smaller mirror and the spatial savings in the height of the entire inventive system, made possible by the specific lines and disposition of the mirror 16, constitutes another important benefit to the consumer provided by this invention. The mirror 16, in the embodiment shown in FIG. 1 is mounted at a 45 degree angle to provide a 90 degree fold.

It should be noted that, in the folded configuration, the controls 23 of the set 22 are more than 30 inches behind the mirror, which spacing renders the controls inoperable. The inventive system suffers no such limitations, with the controls 13 being in easy reach, as best shown in FIG. 4.

The prior art lenses 24 are limited in speed to about f/1.9 as indicated in script in FIG. 2, and are also restricted to about 13 gain screens to avoid a loss of viewing angles.

Figure 4:
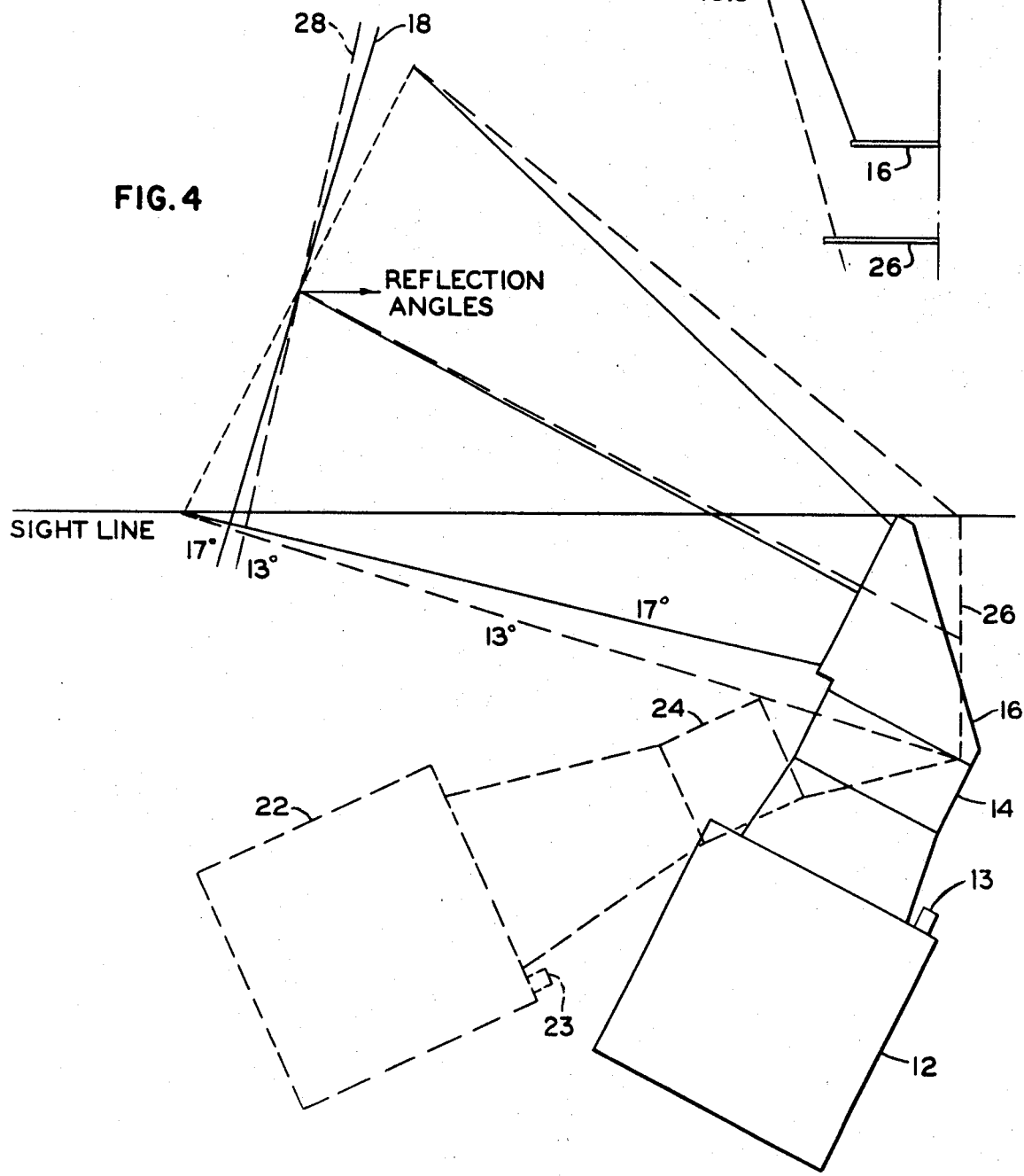
FIG. 4 is a superimposed elevational view of the inventive system and of the typical prior art system, the former being shown in solid lines, and the latter being shown in phantom lines.

FIG. 4 shows the systems of FIG. 1 and 2 in their folded configuration. Examination of FIG. 4 shows the advantage of the 45 degree angular disposition of the mirror 16. The image source 12 and the screen 18 are disposed in substantially perpendicular relation to one another and keystone distortion is thus reduced.

FIG. 4 shows how the placement of the prior art mirror 26 results in a greater loss of perpendicularity between source 22 and screen 28, which produces considerable keystone distortion.

Figure 5:
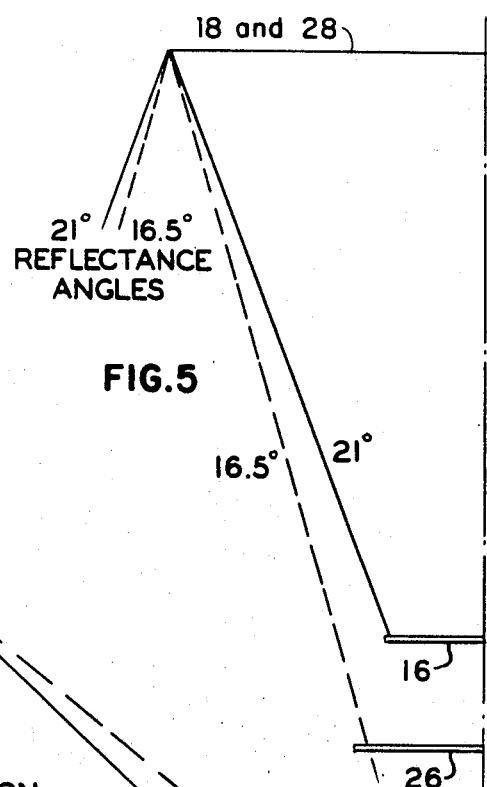
FIG. 5 is a superimposed plan view of the inventive system and of the typical prior art system, showing the corresponding positions of the mirror means of the inventive lens and of the prior art, thereby demonstrating how the difference in mirror size and positioning results in different reflectance angles, the reflectance angle of the inventive system being shown in solid lines, and the reflectance angle of the prior art system being shown in phantom lines.

To redirect the reflectance angles to be parallel with the audience sight line, prior art systems require a screen angle of 13 degrees from the vertical (17 degrees out of perpendicularity) and 17 degrees from the vertical (ideally) for the current invention (out by 13 degrees), FIG. 4. However, because of the wider vertical angle of the current invention, the screen angle of the present invention can be increased to approximately 20 degrees (now out by only 10 degrees), and the reflectance angles will still appear to be parallel to the audience sight line. Careful control of the vertical beam angle produces a 41 percent improvement in keystone distortion. It is apparent in FIGS. 4 and 5 of the drawings that the beam angles are different for the present invention and the prior art systems for both the horizontal and vertical modes. This is caused primarily by the shorter focal length.

Before discussing the specific design of the lens system according to the invention, the theory of Fresnel lenses will first be discussed. Fundamentally, a lens generates a continuous optical curve which operates to focus light. In conventional lenses, the optical curve is provided by varying the thickness of the lens, and such thickness can have an effect on the quality of the image that can be good, bad or neutral, according to the design. The Fresnel lens eliminates the need for a variable thickness lens, but rather utilizes variable slopes, generally in the form of a large number of grooves or Fresnel zones to generate the optical curve. The optical curve is generated by changing the slope of the facets of the grooves or zones from zone to zone. When a large number of grooves or zones are utilized, the facets can be made flat to simplify manufacture and design.

When designing a Fresnel lens, the optical curve required to obtain the necessary lens performance is first obtained. A typical optical curve can be expressed as a polynomial expression or generating function such as:

$$x = y^2/2R + Dy^4 + Ey^6 + Fy^8$$

wherein R, D, E and F are constants determined, for example, by a computer program, y is the zonal radius from the center of the grooves and x is the value of the generating function as a function of y. A program known as "GENII" is commercially available for this purpose. A typical generating function is illustrated in FIG. 6. Such figures are known as general polynomial aspherics.

Figure 7:
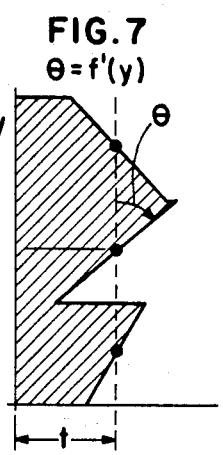
FIG. 7 illustrates several Fresnel zones, the slopes of the zones being determined by differentiating the generating function of FIG. 3 at the illustrated points.

Since in a Fresnel lens, it is the slope of surfaces of the grooves of Fresnel zones, rather than the thickness of the lens, that generates the focusing power, the generating function must be differentiated. The differentiation process results in an equation for the slopes of the facets of the Fresnel zone of the following form, with the slope being expressed as a tangent:

$$\tan \theta = (dx/dy)_y = y/R + 4Dy^3 + 6Ey^5 + 8Fy^7$$

wherein $\tan \theta$ equals the slope of the Fresnel zone facets, and the other constants and variables are as previously defined. A positive value for $\tan \theta$ indicates that the facet surface is tilted clockwise, while a negative value for $\tan \theta$ indicates a counterclockwise tilt. The Fresnel facets for three zones corresponding to three values of y in FIG. 6 are illustrated in FIG. 7.

The following design, when employed in the manner just described, overcomes the limitations of the prior art and harnesses the advantages of 17 times or higher gain screens. The elements form a clear aperture of 9 inches by 12 inches, an aperture stop of 6 inches in diameter, and a spacing of 11 inches (280.6 mm) between elements A and B (as shown in FIG. 4):

Focal length: 280 mm
Apparent speed: f/1.44 as seen from TV side
Nominal CRT diagonal: 13 inches, radius of curvature is 25 inch nominal
Nominal image: 60 inch diagonal, 116 inch radius of curvature
Nominal magnification: 4:6.1
Lens Material: Acrylic plastic of the following prescription:
Lens element A, in a commercial embodiment, has the following values for the variables, y, R, D, E, and F:
Element A: y lies between 0 and at least 171 mm, and center thickness is 0.075 inch
$R = -364.848$ mm
$D = +0.7794 \times 10^{-8}$ mm$^{-3}$
$E = -0.1990 \times 10^{-12}$ mm$^{-5}$
$F = +0.2300 \times 10^{-17}$ mm$^{-7}$
Lens B, in a commercial embodiment, has the following values for the variables, y, R, D, E and F:
Element B: y lies between 0 and at least 110 mm. Center thickness is 0.075 inch
$R = -269.834$ mm
$D = +0.3539 \times 10^{-7}$ mm$^{-3}$
$E = -0.118 \times 10^{-11}$ mm$^{-5}$
$F = +0.5003 \times 10^{-16}$ mm$^{-7}$
Lens C, in a commercial embodiment, has the following values for the variables, y, R, D, E, and F:
Element C: y lies between 0 and at least 171 mm
$R = -142.473$ mm
$D = +0.1322 \times 10^{-7}$ mm$^{-3}$
$E = -0.6375 \times 10^{-12}$ mm$^{-5}$
$F = +0.4502 \times 10^{-17}$ mm$^{-7}$ where the generating function is:

$$x = y^2/2R + Dy^4 + Ey^6 + Fy^8$$

and the slope, $\theta$, at a zonal ray distance, y, from the optical axis is defined as:

$$\tan \theta = y/R + 4Dy^3 + 6Ey^5 + 8Fy^7$$

It will thus be seen that the objects set forth above, including those made apparent from the preceding description, are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A Fresnel lens system having design parameters normalized for a 280 mm focal length represented by the following table:

| Element | R | D | E | F | Separation |
|---|---|---|---|---|---|
| A | −364.848 mm | +0.779 × $10^{-8}$mm$^{-3}$ | −0.1990 × $10^{-12}$mm$^{-5}$ | +0.2300 × $10^{-17}$mm$^{-7}$ | |
| | | | | | 280.6mm (nominal) |
| B | −269.834 mm | +0.3539 × $10^{-7}$mm$^{-3}$ | −0.118 × $10^{-11}$mm$^{-5}$ | +0.5003 × $10^{-16}$mm$^{-7}$ | |
| | | | | | 119.8mm (nominal) |
| C | −142.473 mm | +0.1322 × $10^{-7}$mm$^{-3}$ | −0.6375 × $10^{-5}$mm$^{-5}$ | +0.4502 × $10^{-17}$mm$^{-7}$ | | wherein letters A through C identify the respective lens elements from the screen side to the cathode ray tube side and R, D, E, and F are constants of the following generating function:

$$x = y^2/2R + Dy^4 + Ey^6 + Fy^8$$

where y is the zonal ray distance from the optical axis, and wherein and the slope of the generating function given as a tangent, is defined as:

$$\tan \theta = y/R + 4Dy^3 + 6Ey^5 + 8Fy^7$$

with all dimensions being expressed in millimeters, and wherein the design parameters may be normalized to any other focal length, lengths and lens materials.

2. A Fresnel lens system as recited in claim 1 wherein said lens system is designed to protect an image from a convex image plane having a spherical curve of approximately 23 to 25 inches radius.

3. A Fresnel lens system as recited in claim 2 wherein said image plane is the face plate of a cathode ray tube.

4. A Fresnel lens system as recited in claim 3 wherein the cathode ray tube has approximately a 13 inch diagonal measure.

5. A Fresnel lens system as recited in claim 2 wherein the radius of Element A is approximately 171 mm, the radius of Element B is approximately 110 mm, and the radius of Element C is approximately 171 mm.

6. A Fresnel lens system as recited in claim 5 further including an aperture stop interposed between Element A and Element B.

7. A Fresnel lens system as recited in claim 6 wherein said aperture stop has a diameter of approximately 152 millimeters and is spaced approximately 204 millimeters from Element A.

8. A Fresnel lens system as recited in claim 2 further including a folding mirror disposed between Element A and Element B.

9. A Fresnel lens system as recited in claim 8 wherein said folding mirror is spaced approximately 153 millimeters from Element A and disposed at approximately a 45 degree angle with respect to the optical axis.

10. A Fresnel lens system as recited in claim 9 wherein said folding mirror operates as an aperture stop.

11. A Fresnel lens system as recited in claim 9 wherein said convex image plane is tilted with respect to the optical axis.

* * * * *